United States Patent
Tani et al.

[11] Patent Number: 5,962,836
[45] Date of Patent: Oct. 5, 1999

[54] OPTICAL READER HAVING PLACEMENT DETECTING MECHANISM

[75] Inventors: Nobuhiro Tani; Shuzo Seo; Tetsuya Abe, all of Toyko, Japan

[73] Assignee: Asahi Kogaku Kogyo Kabushiki Kaisha, Tokyo, Japan

[21] Appl. No.: 08/900,601

[22] Filed: Jul. 25, 1997

[30] Foreign Application Priority Data

Jul. 29, 1996 [JP] Japan ................................. 8-216050
Jul. 29, 1996 [JP] Japan ................................. 8-216051

[51] Int. Cl.$^6$ ................................................ G06K 7/10
[52] U.S. Cl. ................ 235/454; 235/462.42; 235/462.48
[58] Field of Search .......................... 325/454, 462, 325/472, 472.01, 462.42, 462.48

[56] References Cited

U.S. PATENT DOCUMENTS

| | | | |
|---|---|---|---|
| 5,285,056 | 2/1994 | Tedesco et al. | 235/472 |
| 5,517,018 | 5/1996 | Zheng et al. | 235/462 |
| 5,567,934 | 10/1996 | Zheng et al. | 235/472 |
| 5,569,902 | 10/1996 | Wood et al. | 235/472 |
| 5,589,678 | 12/1996 | Atsuni et al. | 235/472 |
| 5,633,489 | 5/1997 | Dvorkis et al. | 235/472 |
| 5,656,803 | 8/1997 | Seo | 235/472 |
| 5,786,586 | 7/1998 | Pidhirny et al. | 235/472 |

*Primary Examiner*—Donald Hajec
*Assistant Examiner*—Drew A. Dunn
*Attorney, Agent, or Firm*—Greenblum & Bernstein, P.L.C.

[57] ABSTRACT

A casing of an optical reader comprises a reading head and a handle. The reading head includes a frame portion having a bottom opening of a parallelogram. A first switch and a second switch are provided on the frame portion, adjacent to the bottom opening. The first switch and the second switch are placed symmetrically and diagonally about the center of the bottom opening. When the first switch and the second switch are pressed and the tip ends of them become flush with the frame portion, they are turned on. The optical reading is controlled in accordance with the combination of the signals outputted from the first and second switches.

11 Claims, 10 Drawing Sheets

FIG. 3

| OUTPUT SIGNAL OF SWITCH 13 | OUTPUT SIGNAL OF SWITCH 14 | INPUT SIGNAL OF $P_1$ | INPUT SIGNAL OF $P_2$ | INPUT SIGNAL OF $P_3$ | INPUT SIGNAL OF $\overline{P_{EN}}$ |
|---|---|---|---|---|---|
| 1 | 1 | 1 | 0 | 0 | 1 |
| 0 | 1 | 0 | 1 | 0 | 0 |
| 1 | 0 | 0 | 1 | 0 | 0 |
| 0 | 0 | 0 | 1 | 1 | 0 |

TRUTH-TABLE 1

FIG. 10

| Output Signal of Switch 13 | Output Signal of Switch 14 | Input Signal of $P_1$ | Input Signal of $P_2$ | Input Signal of $P_3$ | Output Signal of $S_1$ | Output Signal of $S_2$ | Output Signal of $S_3$ |
|---|---|---|---|---|---|---|---|
| 1 | 1 | 1 | 0 | 0 | 1 | 1 | 1 |
| 0 | 1 | 0 | 1 | 0 | 0 | 0 | 1 |
| 1 | 0 | 0 | 1 | 0 | 0 | 0 | 1 |
| 0 | 0 | 0 | 1 | 1 | 0 | 0 | 0 |

TRUTH-TABLE 2

OPTICAL READER HAVING PLACEMENT DETECTING MECHANISM

BACKGROUND OF THE INVENTION

1. Field of the Invention

The present invention relates to an optical reader for optically reading an information pattern representing coded data and, more specifically, to an optical reader suitable for reading a two-dimensional information pattern representing coded data.

2. Description of the Related Art

Recently, a tessellated two-dimensional information pattern representing coded data, in which black zones and white zones are two-dimensionally arranged to represent coded data, has been proposed and, further, an optical reader for reading and decoding the coded data from the tessellated information pattern has been developed. The optical reader is frequently constituted as a hand held-type reader, comprising a reading head including a hollow box-like hand casing which has an opening formed in a bottom wall, thereby defining a reading area. The reading head also includes a two-dimensional CCD (charge coupled device) image sensor associated with an image formation lens, which is assembled in a hole formed in a top wall of the head casing. The reading head further includes a light source, incorporated in the top wall of the head casing, which illuminates the reading area defined by the opening of the head casing.

For example, when a two-dimensional information pattern is recorded on an article, the optical reader is placed relative to the article such that the information pattern is encompassed by the reading area of the reading head thereof. Then, the information pattern is illuminated by the light source, and an image of the pattern is focused on a light receiving surface of the image sensor by the image formation lens. The focused image is thereby converted into image signals by the image sensor. The image signals, having been read out from the image sensor, are processed and converted into digital data. Further processing is then required to enable The digital data to be decoded. Once the decoding process is completed, the optical reader produces a visual indication or audio indication, whereby a user can recognize that the optical reading of the information pattern concerned has been properly carried out. Note, if necessary, the decoded data is transmitted to, for example, a host computer which is in communication with the optical reader.

Before the proper optical reading of the two-dimensional information pattern by the image sensor can be completed, the reading head of the optical reader must be properly positioned, with respect to the article, such that the information pattern is completely encompassed by the reading area of the recording head.

However, even if the reading head is properly aligned, the reading head may not be sufficiently stationary, for example, the hand of the user may be trembling. Alternatively, the reading head may be positioned in such a manner that the distance between the article, on which the two dimensional information pattern is recorded, and the reading area is not kept consistent for every portion of the reading area. Accordingly, the image of the two dimensional information pattern is not properly focused on the light receiving surface of the image sensor and, therefore, the optical reading of the pattern is not completed.

SUMMARY OF THE INVENTION

Therefore, an object of the present invention is to provide an optical reader for optically reading an information pattern representing coded data, wherein optically reading can be carried out successfully.

According to the present invention, there is provided an optical reader for optically reading an information pattern representing coded data, comprising a casing and at least two sensors. The casing has an opening, enclosed by a frame portion which is formed on a plane. The opening defines a reading area. The frame portion is placed onto a surface on which the information pattern is provided, so that the information pattern is optically read. The sensors are provided on the frame portion. The sensors output sensing signals which indicate whether or not the sensors are respectively in contact with the surface. The optical reading is carried out in accordance with a combination of the sensing signals. The optical reading is carried out only when all of the signals of the sensors indicate that the sensors are in contact with the surface. An image of the reading area is imaged when the signal of at least one sensor among the sensors indicates that the sensor is in contact with the surface. The optical reading is not completed when all of the signals of the sensors do not indicate that the sensors are in contact with the surface. The optical reader further comprises a light source which emits a light onto the reading area, and a photoelectric conversion device which converts an image of the reading area to an electric signal to accumulate electrical charge corresponding to the electric signal. A luminous intensity of the light and a period of accumulating the electrical charge are controlled in accordance with the combination. The luminous intensity is set in a first intensity or a second intensity which is lower than the first intensity, and the period of accumulating the electrical charge is set in a first period or a second period which is longer than the first period. When all of the signals of the sensors indicate that the sensors are not in contact with the surface, the light has the first intensity, the electrical charge is accumulated in the first period, and the electrical charge is read out in a field mode. When the signal of at least one sensor of the sensors indicates that the sensor is in contact with the surface, the light has the second intensity, the electrical charge is accumulated in the second period, and the electrical charge is read out in a field mode. When all of the signals of the sensors indicate that the sensors are in contact with the surface, the light has the second intensity, the electrical charge is accumulated in the second period, and the electrical charge is read out in a frame mode. The sensors are placed symmetrically about a center of the opening. The opening is constituted as a parallelogram, and the sensors are placed on a diagonal line of the opening. The sensors output an ON signal while the sensors are pressed, and the sensors output an OFF signal while the two sensors are free from pressure. The sensors are provided with a member which prevents slipping.

Further, according to the present invention, there is provided an optical reader for optically reading an information pattern representing coded data, comprising a casing and at least two sensors. The casing has an opening, enclosed by a frame portion which is formed on a plane. The opening defines a reading area. The frame portion is in contact with a surface on which the information pattern is provided, so that the information pattern is optically read. The sensors are provided on the frame portion. The sensors output sensing signals in accordance with a condition of contact between the surface and the frame portion. The optical reading is controlled in accordance with a combination of the sensing signals.

Furthermore, according to the present invention, there is provided an optical reader for optically reading an information pattern representing coded data, comprising a casing and at least two sensors. The casing has an opening, enclosed by a frame portion which is formed on a plane. The opening defines a reading area. The frame portion is placed onto a surface on which the information pattern is provided, so that the information pattern is optically read. The sensors are provided on the frame portion. The sensors output sensing signals that indicate whether or not the sensors are pressed by the surface. The optical reading is controlled in accordance with a combination of the sensing signals.

BRIEF DESCRIPTION OF THE DRAWINGS

The present invention will be better understood from the description of the preferred embodiments of the invention set forth below, together with the accompanying drawings, in which:

FIG. 3 is a truth-table of a first embodiment of an optical reader of the present invention;

FIG. 10 is a truth-table of the second embodiment of an optical reader of the present invention.

DESCRIPTION OF THE PREFERRED EMBODIMENTS

Figure 1:
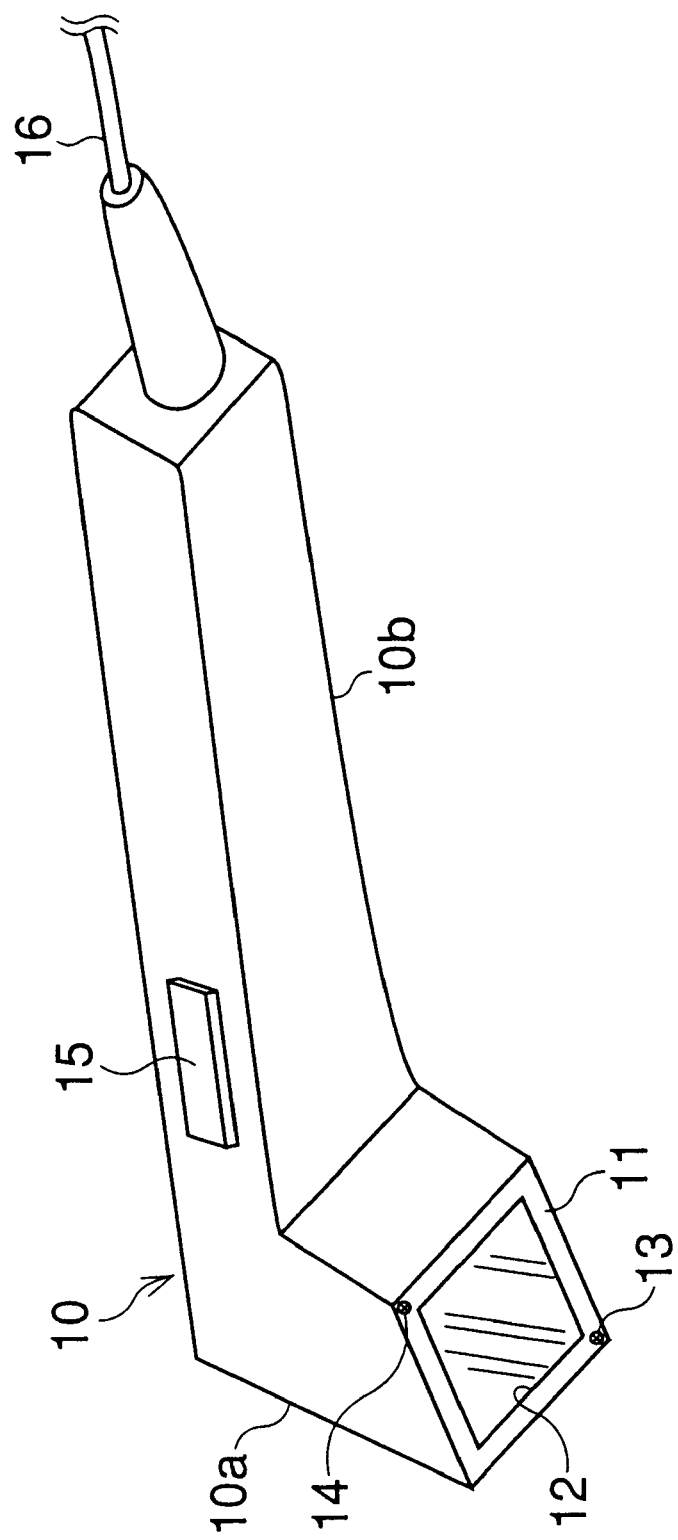
FIG. 1 is a perspective view showing an optical reader for an information pattern according to the present invention.

The present invention will now be described with reference to the embodiments shown in the drawings.

Note, a "symbol" is an information pattern representing coded data, a "symbol surface" is a surface on which the symbol is formed, and "symbol data" is coded data which is represented by the symbol, in this specification.

FIG. 1 shows an optical reader of the first embodiment according to the present invention. A casing 10 of an optical reader comprises a reading head 10a and a handle 10b. The reading head 10a includes a frame portion 11 having a parallelogram-shaped bottom opening 12. A first switch 13 and a second switch 14 are provided on the frame portion 11, adjacent to the bottom opening 12. The first switch 13 and the second switch 14 are placed symmetrically and diagonally about the center of the bottom opening 12. The first switch 13 and the second switch 14 are on-off self-reposition type switches. Namely, when the first switch 13 and the second switch 14 are pressed and the tip ends of the first and second switches 13 and 14 become flush with the frame portion 11, they are turned on. The tip end of both of the first switch 13 and the second switch 14, are respectively covered with a member 13a and 14a to prevent slipping. A trigger switch 15 is provided on the side wall of the handle 10b, which commences the optical reading. A cable 16, which transmits signals outputted from the optical reader 10 to any host computer (not shown), is connected opposite the reading head 10a.

Figure 2:
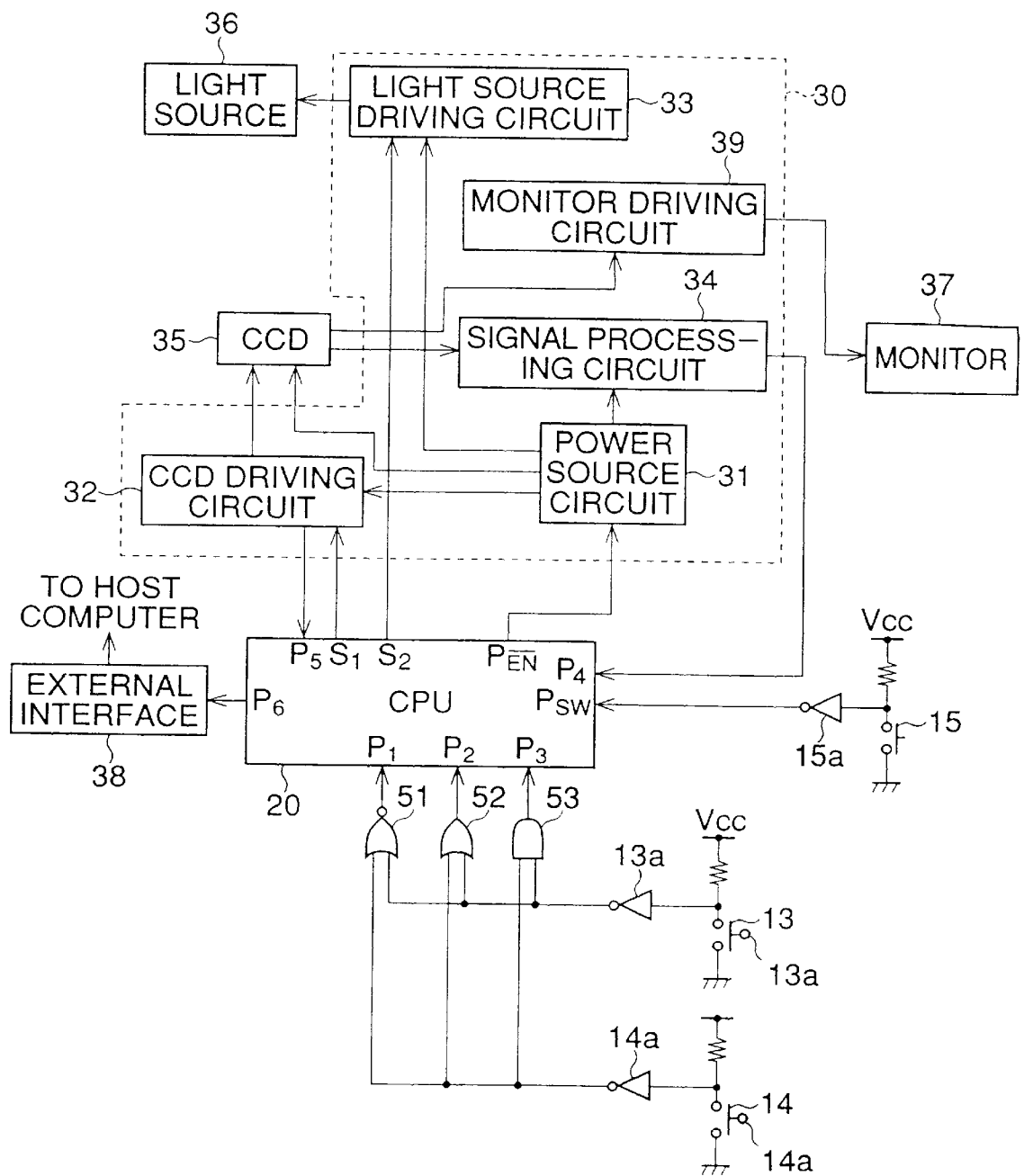
FIG. 2 is a block diagram of an optical reader according to the present invention.

FIG. 2 is a block diagram of the optical reader of the first embodiment according to the present invention, in which a CPU 20 controls the optical reader as a whole. The first switch 13 is connected to logic circuits, i.e., a NOR circuit 51, an OR circuit 52, and an AND circuit 53, through an inverter 13a. The second switch 14 is connected to the NOR circuit 51, the OR circuit 52 and the AND circuit 53, through an inverter 14a. A signal outputted from the NOR circuit 51 is inputted to port $P_1$ of the CPU 20; a signal outputted from the OR circuit 52 is inputted to port $P_2$ of the CPU 20; and a signal outputted from the AND circuit 53 is inputted to port $P_3$ of the CPU 20. The trigger switch 15 is connected to an inverter 15a. A signal outputted from the inverter 15a is inputted to a port $P_{SW}$ of the CPU 20.

An imaging circuit 30 comprises a power source circuit 31, a CCD driving circuit 32, a light source driving circuit 33 and a signal processing circuit 34. The power source circuit 31, the CCD driving circuit 32, the light source driving circuit 33 and the signal processing circuit 34 are respectively connected to the CPU 20. A power source circuit driving signal, which controls the power source circuit 31, is outputted from a port $\overline{PEN}$ of the CPU 20. The power source circuit 31 supplies the power to a CCD 35 and other circuits of the imaging circuit 30, in accordance with the power circuit driving signal. A signal, which controls the CCD driving circuit 32, is outputted from a port $S_1$. A signal, which controls the light source driving circuit 33, is outputted from a port $S_2$. When the level of the power circuit driving signal is low (L), the power source circuit 31 supplies the power to each of the above-mentioned circuits.

A light source 36 is driven in accordance with a control signal outputted from the light source driving circuit 33, whereby the light source 36 emits light to a reading area, which is defined by the bottom opening 12 (see FIG. 1), and which is placed on a symbol surface. The light is reflected by the symbol surface and is directed to the CCD 35, so that an optical image corresponding to the symbol surface is imaged on the surface of the CCD 35. The CCD 35 is driven in accordance with a control signal outputted from the CCD driving circuit 32, whereby the optical image is converted into an image data. The image data, that is, data of all the pixels of the reading area, is outputted to a monitor 37 through a monitor driving circuit 39. The monitor 37 (not shown in FIG. 1) is placed on, for example, an upper side of the casing 10, whereby a user can accurately determine whether the bottom opening 12 is placed on a proper portion or not, by checking an image displayed on the monitor 37. Also, the image data is subjected to predetermined processes, a binarization process and so on, in the signal processing circuit 34, and is then inputted into port $P_4$. Synchronization signals, which are a vertical synchronization signal, a horizontal synchronization signal and a field index signal, are outputted from the CCD driving circuit 32 and are inputted into port $P_5$. The synchronization signals are used for extracting symbol data from the image data. The image data, inputted into port $P_4$, is stored in a memory (not shown) by the CPU 20, in accordance with the synchronization signals inputted into port $P_5$.

Further, the symbol data is extracted from the data of all the pixels of the image in accordance with the synchronization signals. The symbol data is subjected to predetermined processes, a decoding process and so on, to be decoded. When the decoding process is carried out successfully, the decoded symbol data is outputted from port $P_6$ and is transmitted to a host computer through an external interface 38.

In the first embodiment, a control of the imaging circuit 30 in accordance with the condition of the first switch 13 and the second switch 14 is explained with reference to a truth-table 1, shown in FIG. 3. In the truth-table 1, with regard to the output signal of the first switch 13, the second switch 14, and the input signal of ports $P_1$, $P_2$ and $P_3$, "0" is a low signal, which shows a voltage of a low level, and "1" is a high signal which shows a voltage of a high level. When the switch 13 is turned ON, the output signal is "0", and when the switch 13 is turned OFF, the output signal is "1". Similarly, when the switch 14 is turned ON, the output signal is "0", and when the switch 14 is turned OFF, the output signal is "1". Further, in the truth-table 1, when the output signal of the port $\overline{PEN}$ is "0", the power source circuit 31 is powered on, and when the output signal of the port $\overline{PEN}$ is "1", the power source circuit 31 is powered off.

The first line of the truth-table 1 shows the input signals of each of the ports $P_1$, $P_2$, $P_3$ and $\overline{PEN}$, when both of the first and second switches 13 and 14 are turned OFF. When the switches 13 and 14 are turned OFF, namely they are not pressed, the signals which are respectively inputted into the inverters 13a and 14a, are high signals "1". The signals, which are outputted from the inverters 13a and 14a, and are respectively inputted into the NOR circuit 51, the OR circuit 52 and the AND circuit 53, are low signals "0". The signal, which is outputted from the NOR circuit 51 and is inputted into the port $P_1$, is a high signal. The signal, which is outputted from the OR circuit 52 and is inputted into the port $P_2$, is a low signal. The signal, which is outputted from the AND circuit 53 and is inputted into the port $P_3$, is a low signal.

The second line of the truth-table 1 shows the input signals of each of the ports $P_1$, $P_2$, $P_3$ and $\overline{PEN}$, when the switch 13 is ON and the second switch 14 is OFF. When the switch 13 is ON, namely the switch 13 is pressed, the signal, which is outputted from the inverter 13a and inputted into each of the logic circuits, is a high signal. When the switch 14 is OFF, the signal, which is outputted from the inverter 14a and inputted into each of the logic circuits, is a low signal. The signal, which is outputted from the NOR circuit 51 and is inputted into port $P_1$, is a low signal. The signal, which is outputted from the OR circuit 52 and is inputted into port $P_2$, is a high signal. The signal, which is outputted from the AND circuit 53 and is inputted into port $P_3$, is a low signal.

The third line of the truth-table 1 shows the input signals of each of the ports $P_1$, $P_2$, $P_3$ and $\overline{PEN}$, when the switch 13 is OFF and the second switch 14 is ON. When the switch 13 is OFF, the signal, which is outputted from the inverter 13a and inputted into each of the logic circuits, is a low signal. When the switch 14 is ON, the signal, which is outputted from the inverter 14a and inputted into each of the logic circuits, is high signal. The signal, which is outputted from the NOR circuit 51 and is inputted into port $P_1$, is a low signal. The signal, which is outputted from the OR circuit 52 and is inputted into the port $P_2$, is high signal. The signal, which is outputted from the AND circuit 53 and is inputted into port $P_3$, is a low signal.

The fourth line of the truth-table 1 shows the input signals of each of the ports $P_1$, $P_2$, $P_3$ and $\overline{PEN}$, when both of the switches 13 and 14 are ON. When both of the switches 13 and 14 are ON, the signals, which are respectively inputted to the inverters 13a and 14a, are low signals. The signals, which are outputted from the inverters 13a and 14a, and are respectively inputted into the logic circuits, are high signals. The signal, which is outputted from the NOR circuit 51 and is inputted into port $P_1$, is a low signal. The signal, which is outputted from the OR circuit 52 and is inputted into port $P_2$, is a high signal. The signal, which is outputted from the AND circuit 53 and is inputted into port $P_3$, is a high signal.

The signal, which is outputted from port $\overline{PEN}$, is dependent upon the signal which is inputted to the port $P_1$. When the signal, which is inputted to port $P_1$, is high, the signal, which is outputted from the port $\overline{PEN}$, is high ("1"). When the signal, which is inputted to the port $P_1$, is low, the signal, which is outputted from the port $\overline{PEN}$, is low ("0"). As described above, the signal, which is inputted to port $P_1$, is high, only when both of the switches 13 and 14 are OFF. Namely, when both of the switches 13 and 14 are OFF, the power source circuit 31 is not powered ON. Accordingly, the CCD driving circuit 32, the light source driving circuit 33 and the signal processing circuit 34 are not electrically energized, so that the imaging circuit 30 is not driven. Namely, the optical reading of the reading area is not started. On the other hand, when at least one of switch 13 or switch 14 is pressed, the power source circuit 31 is powered ON, so that the imaging circuit 30 is driven and the imaging of the reading area is commenced.

Figure 4:
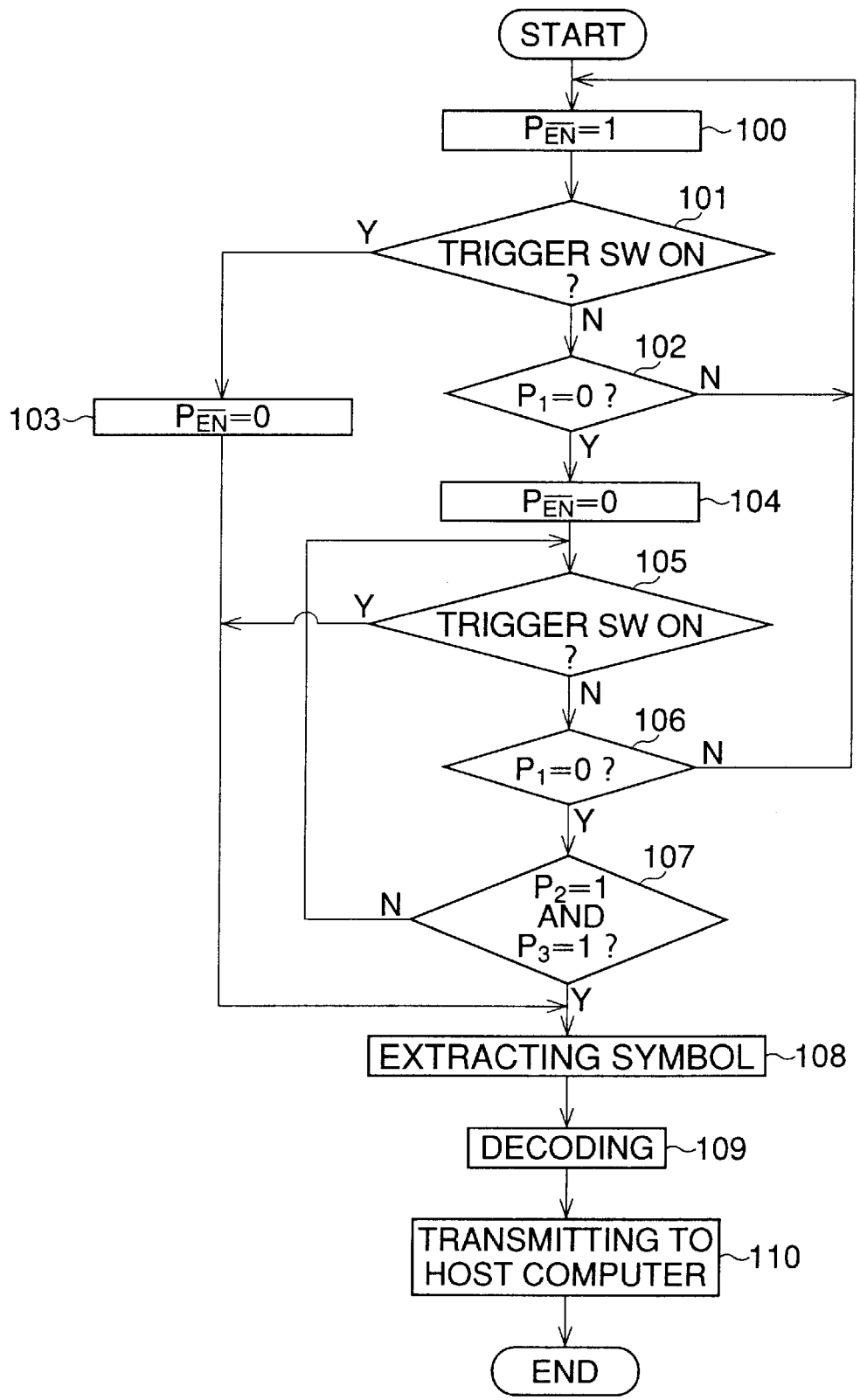
FIG. 4 is a flow chart of the first embodiment of an optical reader of the present invention.

FIG. 4 is a flow chart which shows a process from the imaging of the reading area to the transmitting of the decoded symbol data in the first embodiment.

When the imaging of the reading area starts, the main power of the optical reader is ON, and the CPU 20 is operational. In step 100, "1" is set to the signal which is outputted from the port $\overline{PEN}$. Namely, the imaging circuit 30 is powered OFF in step 100.

In step 101, it is judged whether or not the trigger switch 15 is pressed. If the trigger switch 15 is pressed, in step 103, "0" is set to the signal which is outputted from the port $\overline{PEN}$, and the imaging of the reading area is carried out. The image data is then subjected to the binarization process and other predetermined processes, and the image data is stored in the memory. After that, the process, shown by the flow chart, jumps to step 108. If the trigger switch 15 is not pressed, the process proceeds to step 102.

In step 102, it is judged whether or not the signal which is outputted from port $P_1$ is "0". If the signal is "0" indicating that, at least one of the first switch 13 or the second switch 14 is turned ON, then the process proceeds to step 104. If neither the first switch 13 nor the second switch 14 is turned ON, the process returns to step 100, and the imaging circuit 30 is powered OFF. In step 104, "0" is set to the signal which is outputted from the port $\overline{PEN}$, and the imaging circuit 30 is powered ON. The imaging of the reading area is carried out, the image data is subjected to the binarization process and other predetermined processes, and the image data is stored in the memory. After that, the process proceeds to step 105.

In step 105, it is judged whether or not the trigger switch 15 is pressed. If the trigger switch 15 is not pressed, the process proceeds to step 106. If the trigger switch 15 is pressed, the process jumps to step 108.

In step 106, it is judged whether or not the signal which is outputted from the port $P_1$ is "0". If the signal is "0", at least one of the first switch 13 or the second switch 14 is turned ON, and the process proceeds to step 107. If the signal is not "0", both the first switch 13 and the second switch 14 are turned OFF, the process returns to step 100, and the imaging circuit 30 is powered OFF. In step 107, the signal which is inputted to port $P_2$ and the signal which is inputted to port $P_3$ are determined. If both of the signals are "1", namely both the first switch 13 and the second switch 14 are turned ON, the process proceeds to step 108. If one of the signals is "0", or both of the signals are "0", the process returns to step 105.

In step 108, an extracting process is carried out. Namely, the information of all the pixels of the image data is read out, and the information of the pixels, corresponding to the symbol, is extracted from the information of all the pixels of the image data. In step 109, the information of the pixels corresponding to the symbol is decoded. If the decoding process is carried out successfully, the decoded data of the symbol is transmitted to the host computer in step 110. If the decoding process is not carried out successfully, the transmission to the host computer is not carried out. A user is informed of the result of the decoding process by a buzzer or by an indicating lamp (not shown) provided on the casing 10.

As described above, in this embodiment, "0" is set to the signal which is outputted from the port $\overline{PEN}$, when either the first switch 13 or the second switch 14 is turned ON. Namely, the imaging of the reading area is carried out, by the imaging circuit 30, and the binary data of the reading area is inputted into port $P_4$. However the extraction of the symbol data from the image data is not carried out. Accordingly, when either the first switch 13 or the second switch 14 is turned ON, the imaging circuit 30 is powered ON, and the symbol surface is displayed on the monitor 37, whereby a user can make sure that the symbol is completely encompassed by the reading area until the optical reading is completed.

Figure 5:
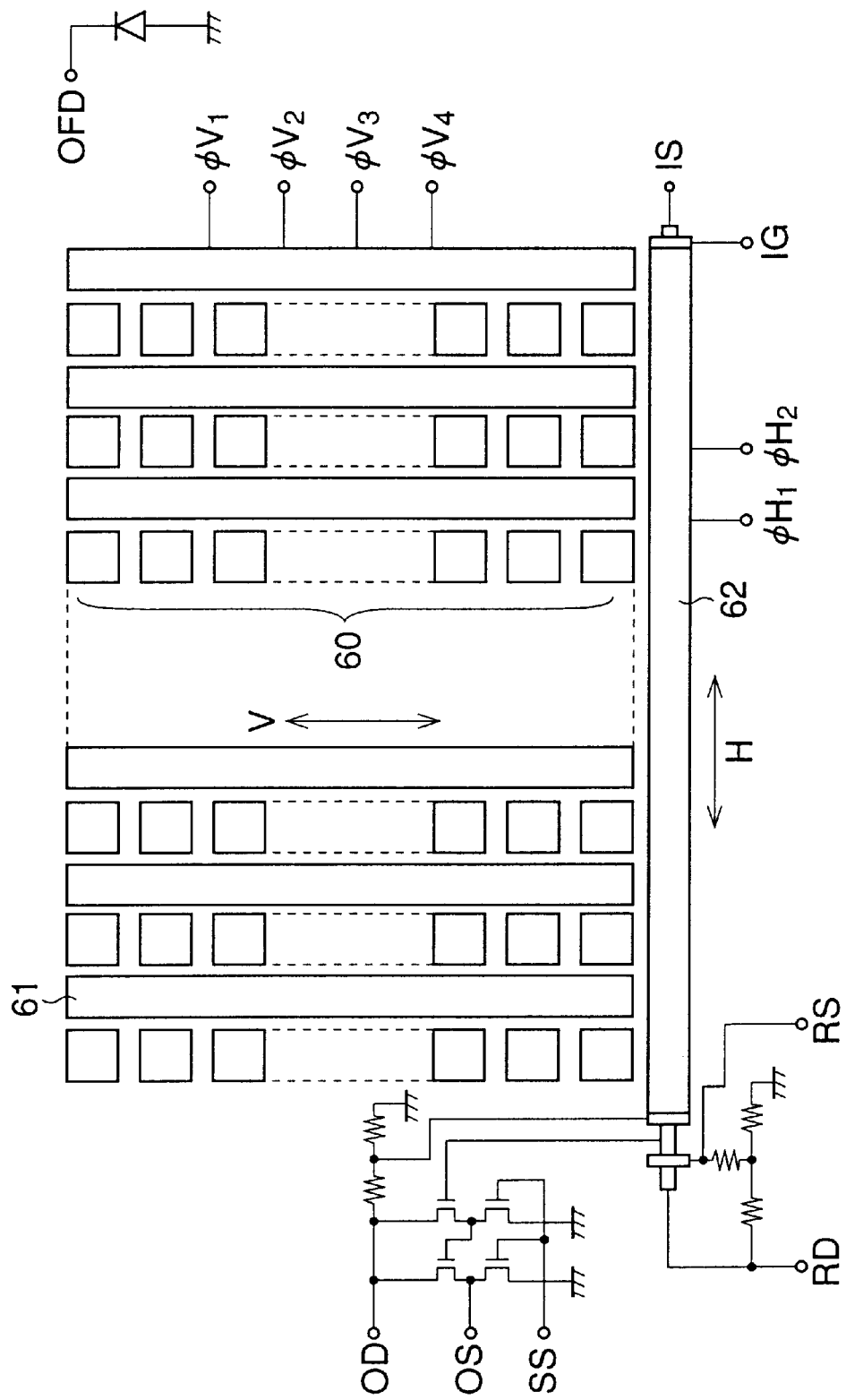
FIG. 5 is a diagrammatic view showing the structure of a conventional CCD used in a second embodiment of an optical reader according to the present invention.

FIG. 5 is a diagrammatic view showing the structure of a conventional CCD used in the second embodiment according to the present invention. Further, the perspective view shown in FIG. 1 and the block diagram shown in FIG. 2, of the first embodiment, are applied to the second embodiment.

Photodiodes 60, corresponding to each of the pixels, are aligned in a plurality of rows, in a V direction (vertical direction). The plurality of lines of the photodiodes 60 and the vertical transfer CCDs 61 are arranged alternately in a H direction (horizontal direction). Electrical charges generated at each of the photodiodes 60 is moved to the vertical transfer CCD 61. The electrical charge is transferred from the vertical transfer CCD 61 to the horizontal transfer CCD 62, whereby the electrical charge is outputted by terminals connected to the horizontal transfer CCD 62.

Figure 6:
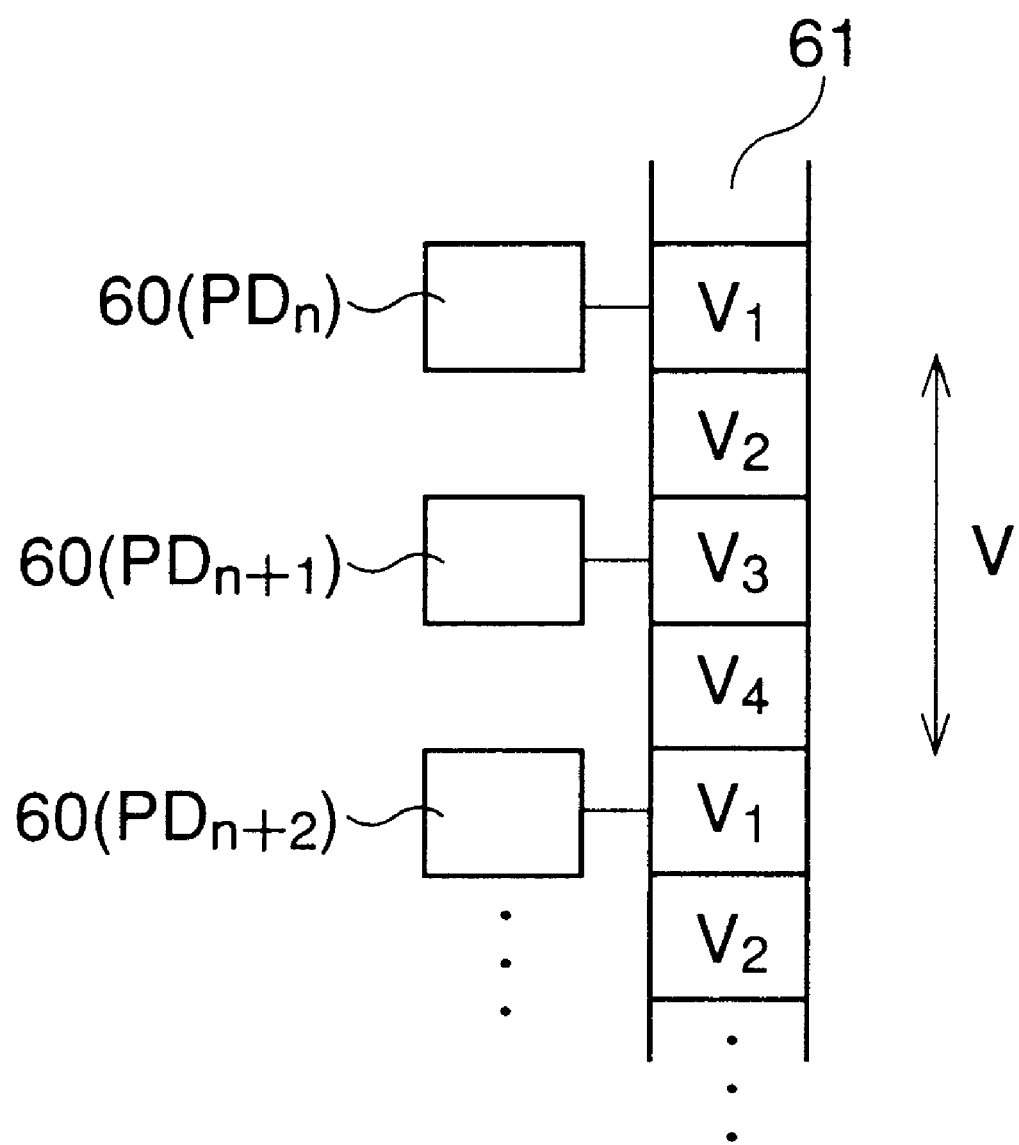
FIG. 6 is an enlarged view showing the structure of photo diodes and a vertical transfer CCD used in the second embodiment of an optical reader according to the present invention.

FIG. 6 is an enlarged view showing the structure of the photodiodes 60 and the vertical transfer CCD 61. The vertical transfer CCD 61 comprises four phase transfer electrodes, $V_1$, $V_2$, $V_3$, $V_4$. The photodiodes 60 are aligned in a V direction (vertical direction). The photodiodes 60 are connected to the transfer electrodes $V_1$ or $V_3$, alternately. Namely, each of the odd photodiodes ($PD_1$, $PD_3$, $PD_5$...) are respectively connected to each of the transfer electrodes $V_1$; each of the even photodiodes ($PD_2$, $PD_4$, $PD_6$...) are respectively connected to each of the transfer electrodes $V_3$. When a voltage is applied to the transfer electrode, electrical charge, accumulated on the transfer electrode, is moved to the vertical transfer CCD 61. The odd photodiodes correspond to odd fields of an image, and the even photodiodes correspond to even fields of the image.

Figure 7:
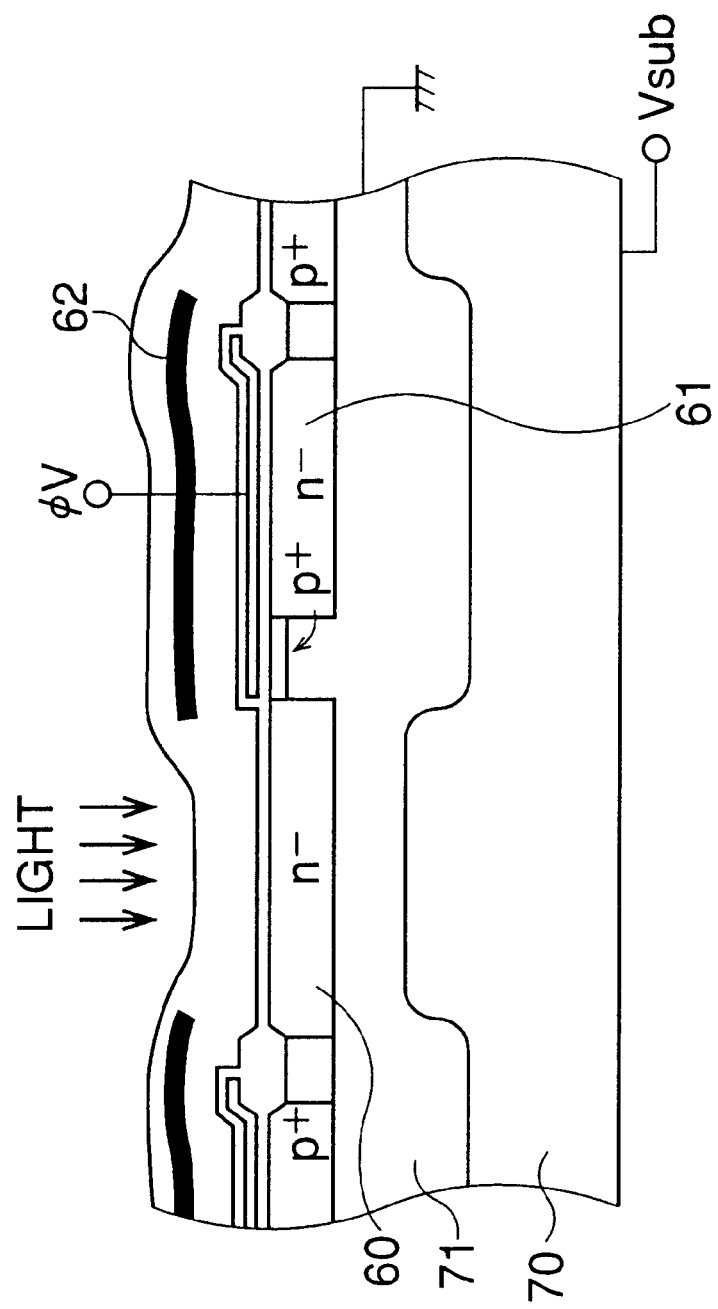
FIG. 7 is a sectional view of an imaging device used in the second embodiment of an optical reader according to the present invention.

FIG. 7 is a sectional view of an imaging device applied in the second embodiment. A pulse for transferring electrical charges is applied to a transfer electrode ØV. A p-type silicon substrate 71 is laminated on an n-type silicon substrate 70. The photodiode 60 (n-type) is provided on the p-type silicon substrate 71. The vertical transfer CCD 61 is formed adjacent to the photodiode 60, and is protected from light by a shield member 62 made of aluminum. By applying a voltage of a few tens of volts (Vsub), a residual electrical charge, remaining in the photodiode 60, is moved to the side of the substrates, and is removed from the imaging device.

Next, a control of the time in which the electrical charge is accumulated in the photodiode 60 will be explained. While the voltage Vsub is being applied to the n-type silicon substrate 70, the residual electrical charge is being removed from the photodiode 60. When application of the voltage Vsub is stopped, accumulation of electrical charge in the photodiode 60 is started. After a predetermined time has passed, a TG pulse, which is a pulse signal for transferring electrical charge, is applied to the electrodes $V_1$ and $V_3$, whereby an electical charge, accumulated in the photodiode 60, is transferred to the electrode of the vertical transfer CCD 61. Therefore, the time, in which an electrical charge is accumulated in the photodiode 60, can be freely regulated by controlling the time of application of the voltage Vsub to the n-type silicon substrate.

Accordingly, by setting the time, in which an electrical charge is accumulated in the photodiode 60, in accordance with the degree of trembling of the casing 10, the reliability of the imaging data becomes higher. Namely, when there is a possibility of the casing 10 trembling, the accumulation time may be set short, conversely, when there is a possibility of the casing 10 not trembling, the accumulation time may be set long. The time, in which an electrical charge is accumulated, is referred to as "electrical shutter speed" hereinafter.

Figure 8:
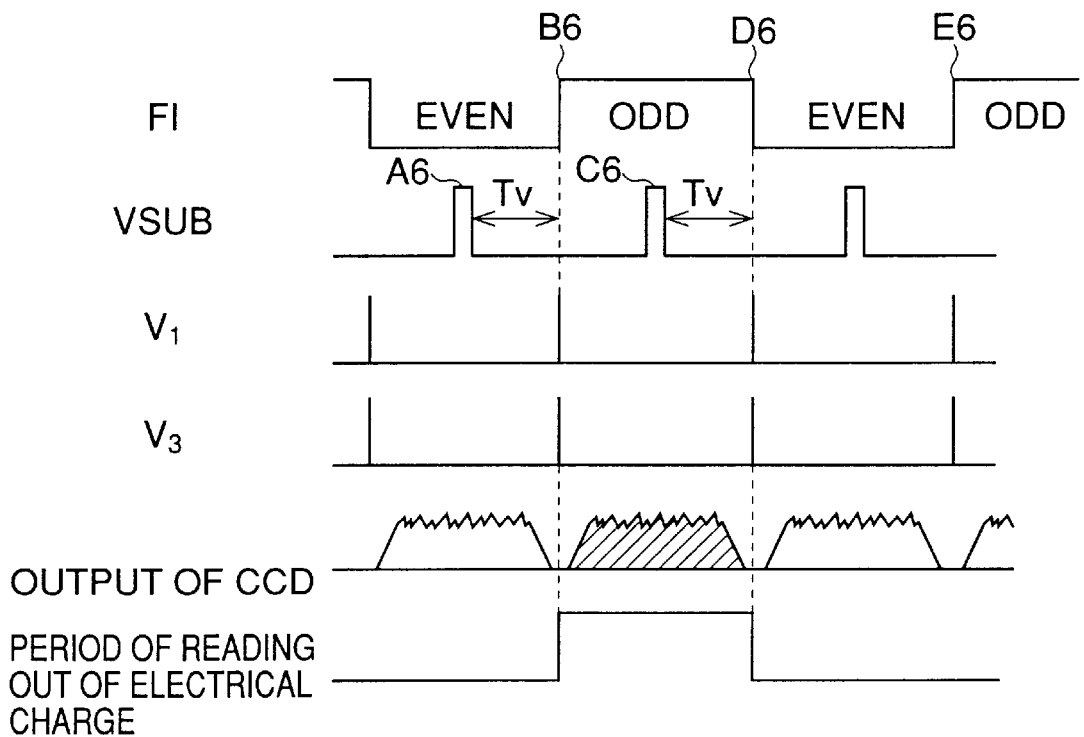
FIG. 8 is a timing chart showing how the electrical charge of each of the photodiodes is read out in a field mode.
Figure 9:
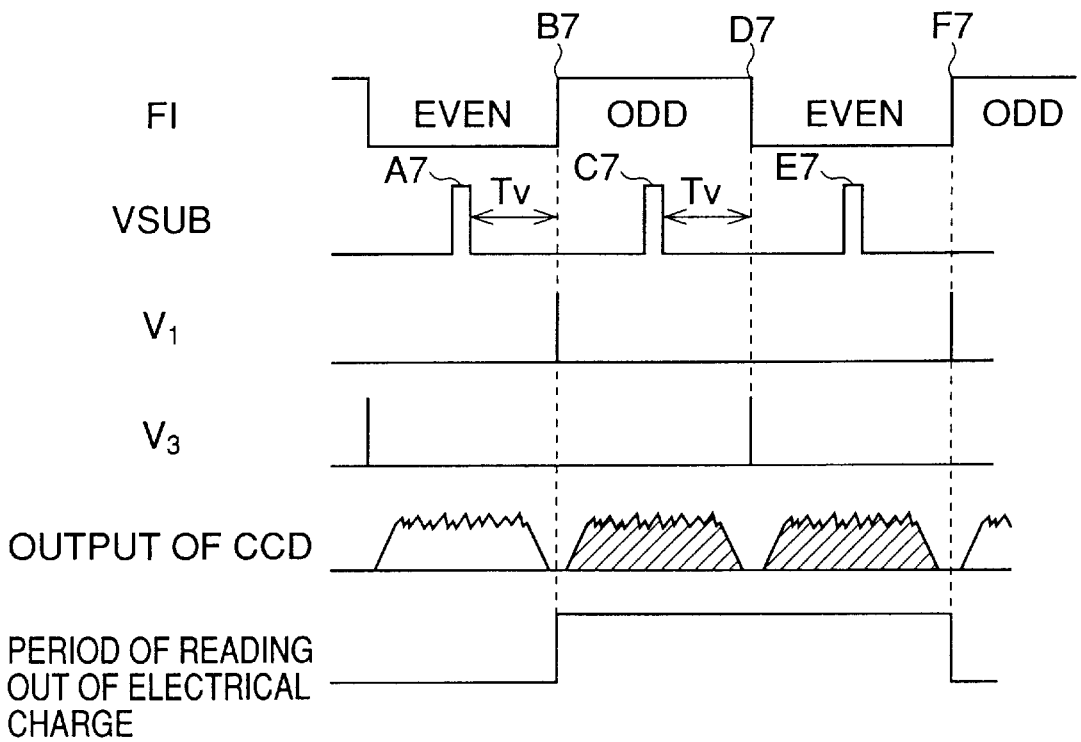
FIG. 9 is a timing chart showing how the electrical charge of each of the photodiodes is read out in a frame mode.

FIG. 8 is a timing chart showing how the electrical charge of each of the photodiodes is read out in a field mode; FIG. 9 is a timing chart showing how the electrical charge of each of the photodiodes is read out in a frame mode. In FIGS. 8 and 9, FI is a field index signal which is outputted from the CCD driving circuit 32. A high level of FI corresponds to an odd field of the image data, and a low level of FI corresponds to an even field of the image data.

In FIG. 8, at A6, the substrate voltage Vsub is applied to the n-type substrate 70, so that a residual electrical charge is removed from each of the photodiodes 60 (see FIG. 5). After that, the accumulating of the electrical charge is started in each of the photodiodes 60. At B6, a predetermined voltage is applied to each of the electrodes $V_1$ and $V_3$, of the vertical transfer CCD 61, whereby the electrical charge corresponding to each of the odd and the even fields, which is accumulated in each of the photodiodes 60, is transferred to the vertical transfer CCD 61. In the vertical transfer CCD 61, the electrical charge accumulated in each of the photodiodes 60 which are placed at odd positions, counted from the horizontal transfer CCD 62, and the electrical charge accumulated in the photodiodes 60 which are placed at even positions, counted from the horizontal transfer CCD 62, and which are placed at a lower side of the odd photodiodes 60, (namely $PD_1$ and $PD_2$, $PD_3$ and $PD_4$...), are added. The added electrical charge is transferred to the horizontal transfer CCD 62. From B6 to D6, the added electrical charge is then outputted from the horizontal transfer CCD 62, so that the electrical charge corresponding to one field of the image data is read out.

At C6, the substrate voltage Vsub is applied to the n-type substrate 70, again, and the residual electrical charge is removed from the photodiodes 60. At D6, similar to B6, a predetermined voltage is applied to each of the electrodes $V_1$ and $V_3$, of the vertical transfer CCD 61, whereby the electrical charge corresponding to each of the odd and even fields, which is accumulated in each of the photodiodes 60, is transferred to the vertical transfer CCD 61. In the vertical transfer CCD 61, the electrical charge accumulated in each of the photodiodes 60 which are placed at odd positions, counted from the horizontal transfer CCD 62, and the electrical charge accumulated in the photodiodes 60 which are placed at even positions, counted from the horizontal transfer CCD 62, and which are placed at an upper side of the odd photodiodes 60, (namely $PD_2$ and $PD_3$, $PD_4$ and $P_5 \ldots$ ), are added. The added electrical charge is then transferred to the horizontal transfer CCD 62. Similarly, from D6 to E6, the added electrical charge is outputted from the horizontal transfer CCD 62, so that the electrical charge corresponding to one field of the image data is read out.

In FIG. 9, at A7, the substrate voltage Vsub is applied to the n-type substrate 70, so that the residual electrical charge is removed from each of the photodiodes 60. After that, the accumulation of the electrical charge is started in each of the photodiodes 60. At B7, a predetermined voltage is applied to each of the electrodes $V_1$, of the vertical transfer CCD 61, whereby the electrical charge corresponding to each of the odd fields of the image data, which is accumulated in each of the photodiodes 60, is transferred to the vertical transfer CCD 61 and is then transferred to the horizontal transfer CCD 62. At the same time, FI is changed to a high level, which indicates an odd field. From B7 to D7, the electrical charge is outputted from the horizontal transfer CCD 62, to be read out as an odd field of the image data.

Further, at C7, the substrate voltage Vsub is applied to the n-type substrate 70, again, and the residual electrical charge is removed from each of the photodiodes 60. At D7, a predetermined voltage is applied to each of the electrodes $V_3$, of the vertical transfer CCD 61, whereby the electrical charge corresponding to each of the even fields, which is accumulated in each of the photodiodes 60, is transferred to the vertical transfer CCD 61 and is then transferred to the horizontal transfer CCD 62. At the same time, FI is changed to a low level, which indicates an even field. From B7 to D7, the electrical charge is outputted from the horizontal transfer CCD 62, to be read out as an even field of the image data.

Accordingly, the reading out mode of the electrical charge corresponding to the image data can be changed from the field mode to the frame mode, or from the frame mode to the field mode, by controlling the phase of the voltage being applied to the electrodes $V_1$ and $V_3$.

In the field mode, the quantity of the information of the image data is half of that of the frame mode, because the electrical charge of the even field and the electrical charge of the odd field are subjected to be added. However, the field mode is effective when there is a possibility of the casing 10 trembling, because the imaging time (from the beginning of the accumulation of the electrical charge to the end of the reading out the electrical charge of all the pixels of the image data) of the field mode is half that of the frame mode.

In the frame mode, high accuracy when decoding the symbol data can be obtained because the quantity of the information of the image data, which is read out, is larger than that of the field mode. On the other hand, the imaging time is twice that of the field mode. Namely, the reading out in the frame mode is easily affected by the trembling of the casing 10. Accordingly, when reading out of the image data is carried out in the frame mode, the opening should be directly positioned over the symbol surface for a longer time than that in the field mode. Also, the reading out in the frame mode is easily affected by the trembling of the casing.

In a second embodiment, a control process of the imaging circuit 30 in accordance with the condition of the first switch 13 and the second switch 14 is explained, with reference to a truth-table 2 shown FIG. 10. In the truth-table 2, with regard to the output signal of the first switch 13, the second switch 14 and the input signal of the ports $P_1$, $P_2$ and $P_3$, "0" is a low signal which shows a voltage of low level, and "1" is a high signal which shows a voltage of high level. The electrical shutter speed (the electrical charge accumulating time) is decided by the output level of the port $S_1$. When the signal of $S_1$ is "1", the electrical shutter speed is high (the electrical charge accumulating time is short). When the signal of $S_1$ is "0", the electrical shutter speed is low speed (the electrical charge accumulating time is long). When the output signal of port $S_2$ is "1", a high electrical current is supplied to the light source, so that the luminous intensity of the light source has a high intensity. When the output signal of port $S_2$ is "0", a low electrical current is supplied to the light source, so that the luminous intensity of the light source has a low intensity. Further, when the output signal of port $S_3$ is "1", the electrical charge is read out from CCD 35 in the field mode, and when the output signal of port $S_3$ is "0", the electrical charge is read out from CCD 35 in the frame mode.

The first line of the truth-table 2 shows the signals of each of the ports $P_1$, $P_2$, $P_3$, $S_1$, $S_2$ and $S_3$, when both of the switches 13 and 14 are turned OFF. When the switches 13 and 14 are turned OFF, namely they are not pressed, the signals, which are respectively inputted to the inverters 13a and 14a, are high signals "1". The signals, which are outputted from the inverters 13a and 14a, and are respectively inputted into the NOR circuit 51, the OR circuit 52 and the AND circuit 53, are low signals "0". The signal, which is outputted from the NOR circuit 51 and is inputted into port $P_1$, is a high signal. The signal, which is outputted from the OR circuit 52 and is inputted into port $P_2$, is a low signal. The signal, which is outputted from the AND circuit 53 and is inputted into port $P_3$, is a low signal.

The second line of the truth-table 2 shows the signals of each of the ports $P_1$, $P_2$, $P_3$, $S_1$, $S_2$ and $S_3$, when switch 13 is ON and second switch 14 is OFF. When the switch 13 is ON, namely the switch 13 is pressed, the signal, which is outputted from the inverter 13a and inputted into each of the logic circuits, is a high signal. When switch 14 is OFF, the signal, which is outputted from the inverter 14a and inputted into each of the logic circuits, is a low signal. The signal, which is outputted from the NOR circuit 51 and is inputted into port $P_1$, is a low signal. The signal, which is outputted from the OR circuit 52 and is inputted into port $P_2$, is a high signal. The signal, which is outputted from the AND circuit 53 and is inputted into port $P_3$, is a low signal.

The third line of the truth-table 2 shows the signals of each of the ports $P_1$, $P_2$, $P_3$, $S_1$, $S_2$ and $S_3$, when switch 13 is OFF and second switch 14 is ON. When switch 13 is OFF, the signal, which is outputted from the inverter 13a and inputted into each of the logic circuits, is a low signal. When switch 14 is ON, the signal, which is outputted from the inverter 14a and inputted into each of the logic circuits, is a high signal. The signal, which is outputted from the NOR circuit 51 and is inputted into port $P_1$, is a low signal. The signal, which is outputted from the OR circuit 52 and is inputted into port $P_2$, is a high signal. The signal, which is outputted from the AND circuit 53 and is inputted into port $P_3$, is a low signal.

The fourth line of the truth-table 2 shows the signals of each of the ports $P_1$, $P_2$, $P_3$, $S_1$, $S_2$ and $S_3$, when both of the switches 13 and 14 are ON. When both of switches 13 and 14 are ON, the signals, which are respectively inputted to the inverters 13a and 14a, are low signals. The signals, which are outputted from the inverters 13a and 14a and are respectively inputted into the logic circuits, are high signals. The signal, which is outputted from the NOR circuit 51 and is inputted into port $P_1$, is a low signal. The signal, which is outputted from the OR circuit 52 and is inputted into port $P_2$, is a high signal. The signal, which is outputted from the AND circuit 53 and is inputted into the port $P_3$, is a high signal.

The signal, which is outputted from port $S_1$, is dependent upon the signal which is inputted into port $P_1$. When both of the switches 13 and 14 are OFF, the output signal of the port $S_1$ is "1". Namely, the electrical shutter speed is set high. When at least one of the switches 13 or 14 is ON, the output level of port $S_1$ is "0". Namely, the electrical shutter speed is set low.

Similarly, the signal of the port $S_2$ is dependent upon input signal of port $P_1$. When both of the switches 13 and 14 are turned OFF, the output signal of port $S_2$ is "1", whereby a high electrical current is supplied to the light source, so that the luminous intensity of the light source is high. When at least one of the switches 13 or 14 is turned ON, the output signal of the port $S_2$ is "0", whereby a low electrical current is supplied to the light source, so that the luminous intensity of the light source is low.

The output signal of port $S_3$ is dependent upon the input signal of port $P_3$. When both of the switches 13 and 14 are turned ON, the output signal of port $S_3$ is "0", whereby the image data is read out in the frame mode. When both of the switches 13 and 14 turned are OFF, or only one of the switches 13 and 14 is turned ON, the output signal of the port $S_3$ is "1", whereby the image data is read out in the field mode.

Figure 11:
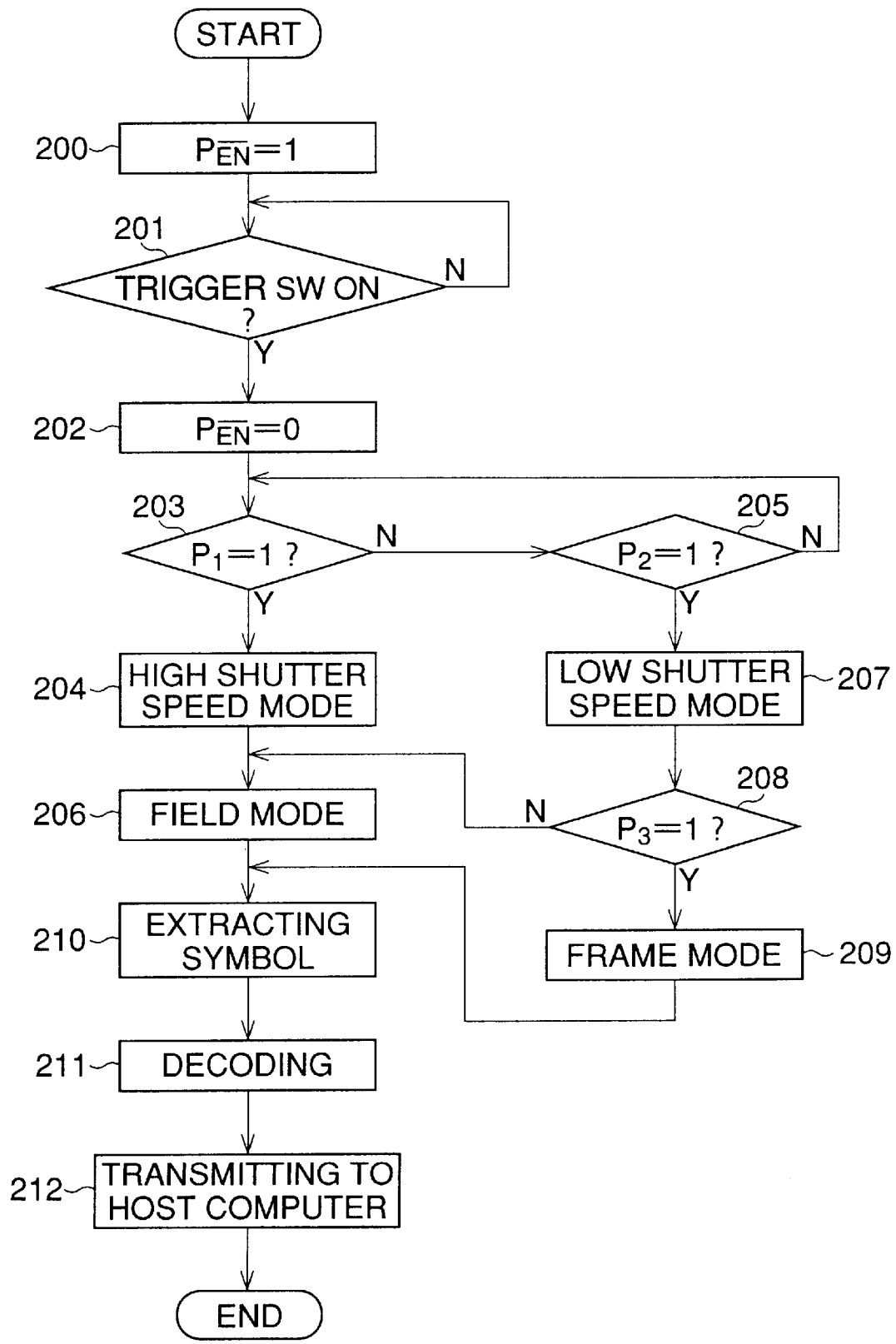
FIG. 11 is a flow chart of the second embodiment of an optical reader according to the present invention.

FIG. 11 is a flow chart which shows the process from the imaging of the reading area to the transmitting of the decoded symbol data in the second embodiment. In the flow chart, a "high shutter speed mode" and a "low shutter speed mode" mean a mode in which the symbol surface is imaged. For example, in the high shutter speed mode, the electrical charge according to the image data of the reading area is accumulated in the photodiodes 60 for 1/1000 sec, and an electric current of 20 mA is supplied to the light source, and in the low shutter speed mode, the electrical charge according to the image data of the reading area is accumulated in the photodiodes 60 for 1/200 sec, and an electric current of 4 mA is supplied to the light source.

When the imaging of the reading area starts, the main power of the optical reader is ON, and the CPU 20 is operational. In step 200, "1" is set to the signal which is outputted from port $\overline{PEN}$. Namely, the power of the imaging circuit 30 is turned OFF in step 200.

In step 201, it is judged whether or not the trigger switch 15 is pressed. If the trigger switch 15 is pressed, the process goes to step 202. If the trigger switch 15 is not pressed, the process does not proceed. Namely, by pressing the trigger switch 15, the optical reading of the symbol is started. In step 202, "0" is set to the signal which is outputted from port $\overline{PEN}$, so that the imaging circuit 30 is powered ON, and then, the process goes to step 203.

In step 203, it is judged whether or not the input signal of port $P_1$ is "1". If the input signal of port $P_1$ is "1", namely both of the first and second switches 13 and 14 are OFF, the process goes to step 204. In step 204, the high shutter speed mode is set to the mode in which the symbol surface is imaged. On the other hand, if the input signal of port $P_1$ is "0", namely at least one of the first or second switch 13 or 14 is ON, the process goes to step 205.

After the high shutter speed mode is set to the imaging mode in step 204, the field mode is set to the reading out mode of the electrical charge in step 206. Further, in step 206, the symbol surface is imaged, the image data is subjected to the binarization process and other predetermined processes, and then the image data is stored in the memory. After that, the process goes to step 210.

In step 210, the image data is read out from the memory, and the pixel data corresponding to the symbol data (the information pattern) is extracted from the image data. In step 211, the pixel data is decoded. If the decoding process is successfully carried out in step 211, the decoded data is transmitted to the host computer (step 212). If the decoding process is not successfully carried out in step 211, the decoded data is not transmitted to the host computer. Further, a visual indication or audio indication is produced in accordance with the result of the decoding process, whereby a user can recognize that the optical reading of the symbol has been properly carried out. For example, a lamp (not shown) provided on the side of the casing 10 may be used as the visual indication, and a buzzer may be used as the audio indication.

On the other hand, in step 205, it is judged whether or not the signal, which is inputted into port $P_2$, is "1". If the input signal of port $P_2$ is "1", namely at least one of the first or second switch 13 or 14 is ON, the process goes to step 207. If the input signal of port $P_2$ is "0", the process returns to step 203.

In step 207, the low shutter speed mode is set to the mode in which the symbol surface is imaged. Then, in step 208, it is judged whether or not the signal, which is inputted into port $P_3$, is "1". If the input signal of port $P_3$ is "1", namely both the first and second switches 13 and 14 are ON, the process goes to step 209. In step 209, the frame mode is set to the reading out mode of the electrical charge. Further, in step 209, the symbol surface is imaged, the image data is subjected to the binarization process and other predetermined processes, and then the image data is accumulated in the memory. After that, the process goes to step 210. From step 210 to step 212, the processes as described previously are carried out.

On the other hand, if the input signal of port $P_3$ is "0", the process goes to step 206. From step 206 to step 212, the processes are carried out as described above.

In the second embodiment, it is sensed by the first and second switches 13, 14, provided adjacent to the bottom opening 12, that the symbol surface and the frame portion 11, on which the bottom opening 12 is provided, are in contact with each other, whereby when there is a possibility of the casing trembling, the electrical charges accumulated in the photodiodes of the CCD are read out in the field mode, and when there is a possibility of the casing not trembling, the electrical charges accumulated in the photodiodes of the CCD are read out in the frame mode. Namely, the reading mode is selected in accordance with the condition of the first and second switches 13, 14 provided adjacent to the bottom opening 12, to make the best use of each of the characteristics of the reading modes.

Accordingly, since the reading mode is selected so that the symbol surface can be more accurately imaged, the possibility of failing to decode the symbol data, extracted from the image data of the reading area, is lowered, whereby the probability of successfully decoding the symbol data becomes higher.

In the first and second embodiments, the first and second switches 13 and 14 are placed on the diagonal line of the bottom opening 12, and when the tip ends of the switches become flush with the frame portion 11, the switches are turned ON. Accordingly, the bottom opening 12 is positioned on the symbol surface by keeping both of the switches on, whereby the trembling of the casing 10 is easily prevented.

Further, the first and second switches 13, 14 may be turned ON, when they are pressed and the surfaces of them are not flush with the frame portion 11. In the operation of the casing 10 provided with such switches, even if the casing 10 is trembled, the degree of the inclination of the casing 10 is kept lower by keeping the switches ON. Namely, when the casing 10 is trembled, the casing 10 is moving around the axis of the diagonal line of the bottom opening 12, the corners of the frame portion 11, at which the switches are not provided, come into contact with the symbol surface, so that significant trembling while holding the casing 10 is prevented. Accordingly, while the casing 10 is trembling, the blur of the image of the symbol surface, which is imaged on the surface of the CCD, can be minimized.

Furthermore, in the first and second embodiments, the number of the switches is limited to two, so that some processes in the CPU 20 are not complicated and are carried out quickly. Namely, in the embodiments, the greater effect, by placing the switches on the diagonal line of the bottom opening 12, is obtained using the smallest number of the switches.

Also, in the first and second embodiments, since the first and second switches 13, 14 are placed symmetrically about the center of the bottom opening 12 therebetween, only one side of the frame portion 11 being in contact with the symbol surface and the other three sides of the frame portion 11 being far from the symbol surface is prevented. Accordingly, the bottom opening 12 can be positioned onto the symbol surface.

In the first and second embodiments, the top of both the first switch 13 and the second switch 14 are covered with a member to prevent slipping. The casing 10, therefore, does not slip on the symbol surface while keeping the switches ON. Accordingly, the image data of the reading area, outputted from the CCD 35, is not blurred, thereby preventing the position of the symbol on the symbol surface not being specified, or the wrong symbol data being extracted. Namely, the symbol data can be securely extracted from the image data of the symbol surface.

In the first embodiment, while one switch is pressed, the power of the imaging circuit 30 is kept ON, whereby the extraction of the symbol data is commenced quickly as the other switch comes to be pressed.

In the second embodiment, when the symbol is imaged at the low electrical shutter speed, the electrical current supplied to the light source is lowered. Accordingly, the consumption of electrical current is economized.

Further, in the second embodiment, when the symbol is imaged at the high electrical shutter speed, $1/1000$ sec is set to the electrical charge accumulating time and the electric current of 20 mA is supplied to the light source. When the symbol is imaged at the low electrical shutter speed, $1/200$ sec is set to the electrical charge accumulating time and an electric current of 4 mA is supplied to the light source. However, other values of the electrical charge accumulating time and the electric current can be set, to ensure that the symbol surface is securely imaged on the surface of the CCD in accordance with the state of the contact between the symbol surface and the frame portion.

In the first and second embodiments, two switches are provided on the frame portion 11. However, more than two switches can be provided on the frame portion 11 in such a manner that the switches are placed symmetrically about the center of the bottom opening 12 therebetween.

The present disclosure relates to subject matter contained in Japanese Patent Application Nos. HEI 8-216050 (filed on Jul. 29, 1996) and HEI 8-216051 (filed on Jul. 29, 1996) which are expressly incorporated herein, by reference, in their entirety.

We claim:

1. An optical reader that optically reads an information pattern representing coded data, comprising:

a casing having an opening, enclosed by a frame portion formed on a plane, said opening defining a reading area, said frame portion being placed onto a surface on which the information pattern is provided so that said information pattern is optically read; and at least two sensors provided on said frame portion that output sensing signals indicating whether said at least two sensors are respectively in contact with the surface, said reading area being imaged when the output sensing signals indicate that at least one sensor of said at least two sensors is in contact with the surface, the information pattern being optically read only when said output sensing signals indicate that said at least two sensors are in respective contact with the surface.

2. The optical reader of claim 1, wherein said optical reading of the information pattern is not terminated when said output sensing signals indicate that less than said at least two sensors are in respective contact with said surface.

3. An optical reader according to claim 1, wherein said at least two sensors are placed symmetrically about a center of said opening.

4. An optical reader according to claim 3, wherein said opening is arranged as a parallelogram, and said at least two sensors are placed on a diagonal line of said opening.

5. An optical reader according to claim 1, wherein said at least two sensors output an ON signal when said at least two sensors are pressed, and said at least two sensors output an OFF signal when said at least two sensors are free from a pressing pressure.

6. An optical reader according to claim 1, wherein said at least two sensors are provided with a member which prevents slipping.

7. An optical reader that optically reads an information pattern representing coded data, comprising:

a casing having an opening positioned proximate a surface on which an information pattern is formed, said opening defining a reading area;

a plurality of sensors that determine a relationship of said opening of said optical reader with respect to the surface;

a light source that emits light onto said reading area and illuminates the information pattern; and a photoelectric conversion device that converts an image of the information pattern in said reading area to an electric signal, a condition of exposure being determined in accordance with a combination of signals output by said plurality of sensors, said photoelectric conversion device further converts said image to an electric signal to accumulate an electrical charge corresponding to said electric signal, wherein a luminance intensity of said light and a period of accumulating said electrical charge are controlled in accordance with said combination of signals output by said plurality of sensors.

8. The optical reader of claim 7, wherein said luminous intensity is set to one of a first intensity and a second intensity, said second intensity being lower than said first intensity, and said period of accumulating said electrical charge is set to one of a first period and a second period, said second period being longer than said first period.

9. The optical reader of claim 8, wherein when said combination of signals output by said plurality of sensors indicates that less than all of said plurality of sensors are in contact with said surface, said light has said first intensity, said electrical charge is accumulated in said first period, and said electrical charge is read out in a field mode.

10. The optical reader of claim 8, wherein when said combination of signals output by said plurality of sensors indicate that at least one sensor of said plurality of sensors is in contact with said surface, said light has said second intensity, said electrical charge is accumulated in said second period, and said electrical charge is read out in a field mode.

11. The optical reader of claim 8, wherein when combination of signals output by said plurality of sensors indicate that said plurality of sensors are in contact with said surface, said light has said second intensity, said electrical charge is accumulated in said second period, and said electrical charge is read out in a frame mode.

\* \* \* \* \*